US005671343A

United States Patent [19]
Kondo et al.

[11] Patent Number: 5,671,343
[45] Date of Patent: Sep. 23, 1997

[54] THREE-DIMENSIONAL MODELING APPARATUS AND METHOD UTILIZING THE EXTRACTION OF TOPOLOGICAL DATA, AS FROM TWO-DIMENSIONAL DRAWINGS

[75] Inventors: Satoshi Kondo, Kawasaki; Kazuma Shimizu, Kashiwa; Yuichi Sato, Yokohama, all of Japan

[73] Assignee: Canon Kabushiki Kaisha, Tokyo, Japan

[21] Appl. No.: 354,886

[22] Filed: Dec. 9, 1994

Related U.S. Application Data

[63] Continuation of Ser. No. 753,977, Sep. 3, 1991, abandoned.

[30] Foreign Application Priority Data

Sep. 4, 1990 [JP] Japan ................... 2-235391
Sep. 4, 1990 [JP] Japan ................... 2-235392

[51] Int. Cl.[6] .................. G06T 17/20; G06T 7/60
[52] U.S. Cl. .................. 395/119; 395/120; 395/127; 382/154; 382/204; 382/203
[58] Field of Search .................. 395/120, 127, 395/123, 141, 119; 382/22, 25, 26, 28, 154, 199, 203, 204, 206

[56] References Cited

U.S. PATENT DOCUMENTS

| 4,752,964 | 6/1988 | Okada et al. ............ 382/154 |
| 4,888,711 | 12/1989 | Nguyen ............ 395/120 |
| 4,982,438 | 1/1991 | Usami et al. ............ 382/154 |
| 5,129,054 | 7/1992 | Alstad et al. ............ 395/127 X |
| 5,202,928 | 4/1993 | Tomita et al. ............ 382/154 |

OTHER PUBLICATIONS

Chen et al., "Automatic Reconstruction of 3D Solid Objects from 2D Orthographic Views", Pattern Recognition, vol. 21, NO. 5, 1988, pp. 439–449.

Preiss, "Constructing the Solid Representation from Engineering Projections", Comput. & Graphics, vol. 8, no. 4,1984, pp. 381–389.

ACM Computer Graphics, "Solid Model Input Through Orthographic Views", H. Sakurai et al., vol. 17,No. 3, Jul. 1983, pp. 243–252.

ASME Computers in Engineering, "Reconstruction of 3D Objects Using a KB Environment", V. Nagasamy et al., vol. 1, Jul. 1989, pp. 117–126.

Collection Of Papers Presented At 8th Design Symposium In Tokyo, "Automatic Restroation of An Original Solid From Three Projections", Jul. 1990.

*Primary Examiner*—Raymond J. Bayerl
*Attorney, Agent, or Firm*—Fitzpatrick, Cella, Harper & Scinto

[57] ABSTRACT

A three-dimensional model is formed from information of two-dimensional drawings. Information representing section is formed from the two-dimensional drawing information. Geometrical and topological information is then extracted, and the three-dimensional model is thereby formed.

6 Claims, 9 Drawing Sheets

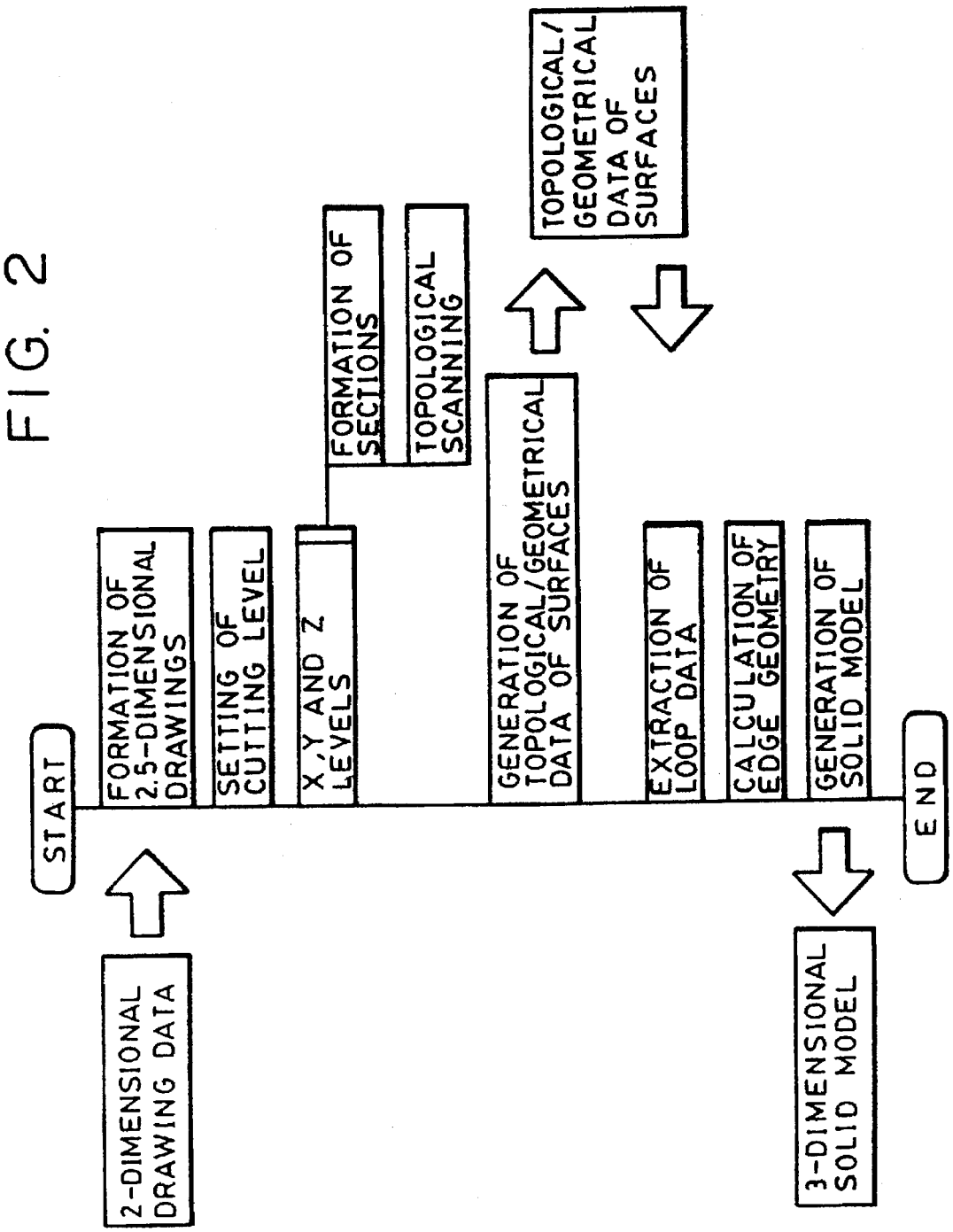

FIG. 3a
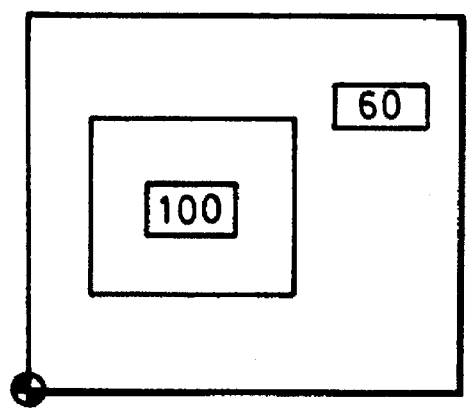
PV
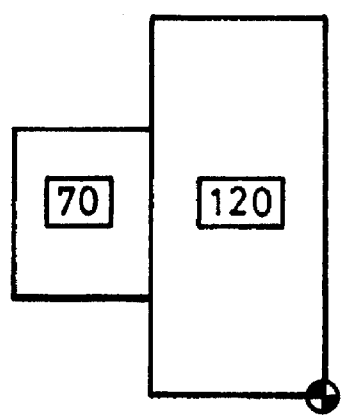
RV
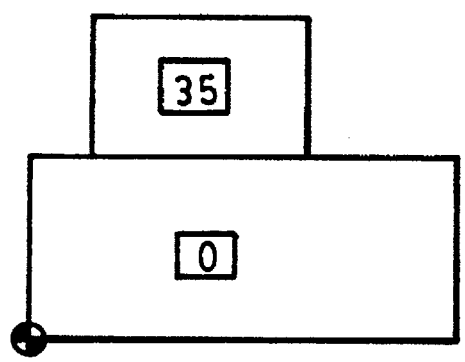
UV

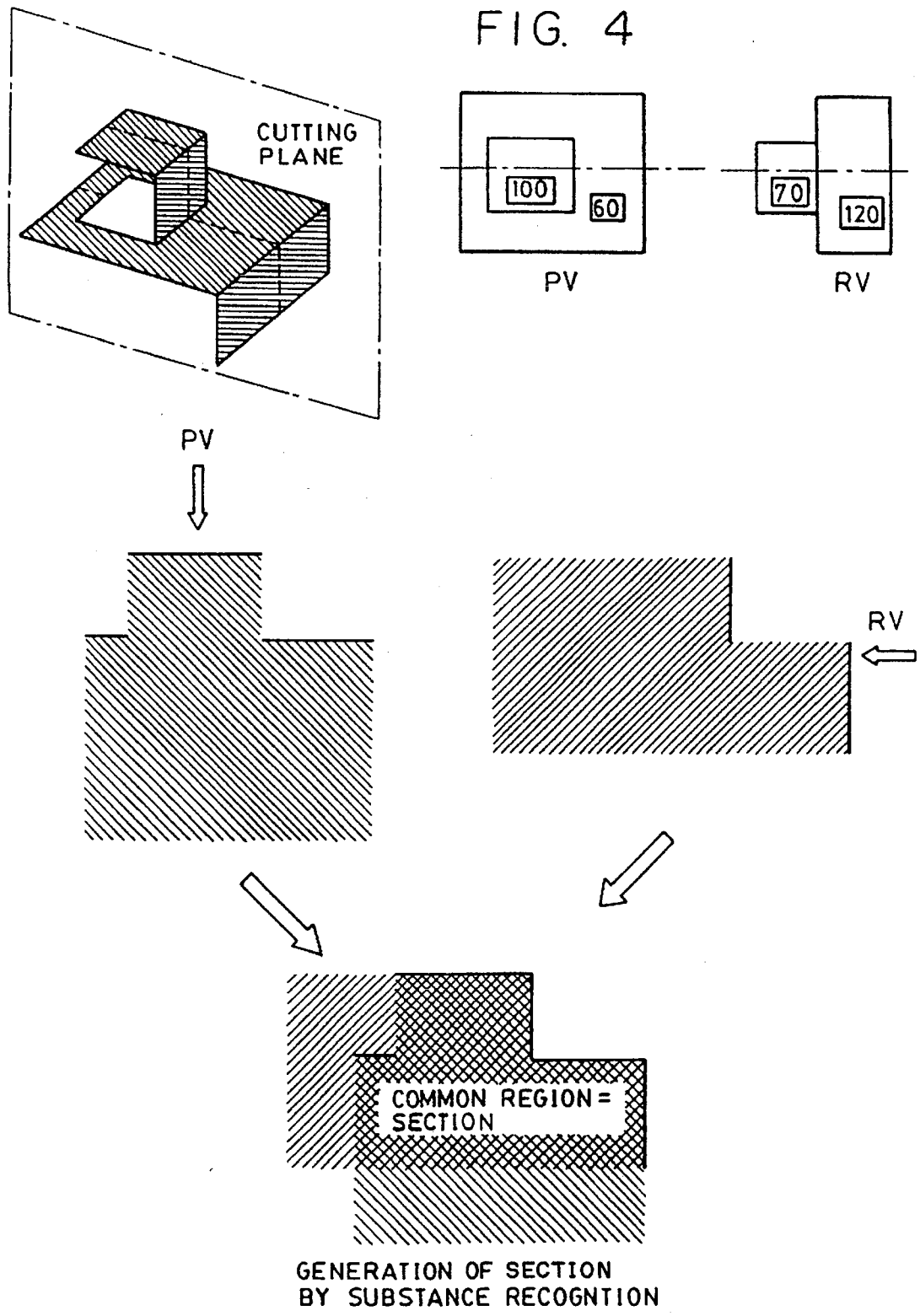

FIG. 7
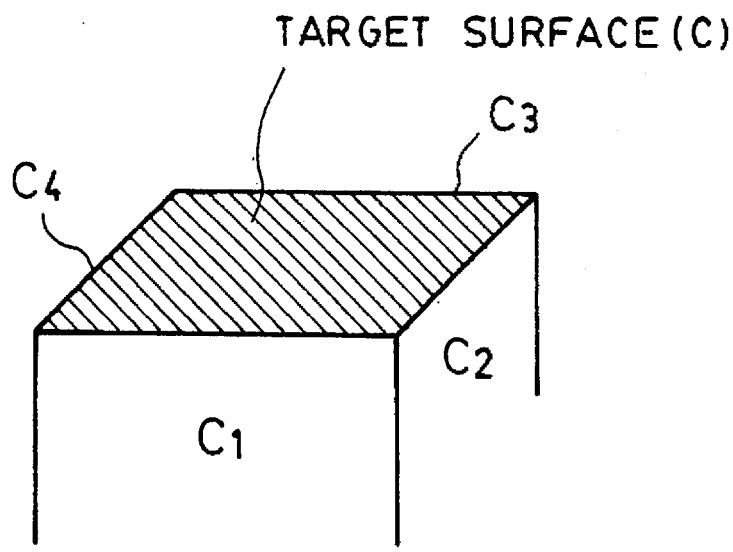
TARGET SURFACE (C)
TABLE OF SURFACES ADJACENT TO TARGET SURFACE $C = \{C_1, C_2, C_3, C_4\}$
TABLE OF CONNECTION RELATIONSHIP OF SURFACES ADJACENT TO TARGET SURFACE C
$$D = \{(C_1, C_2), (C_2, C_3), (C_3, C_4), (C_4, C_1)\}$$
ORDERING OF SURFACES ADJACENT TO TARGET SURFACE C
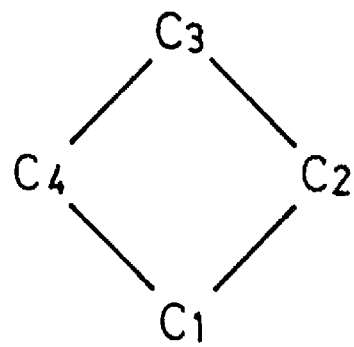

THREE-DIMENSIONAL MODELING APPARATUS AND METHOD UTILIZING THE EXTRACTION OF TOPOLOGICAL DATA, AS FROM TWO-DIMENSIONAL DRAWINGS

This application is a continuation of U.S. application Ser. No. 07/753,977 filed Sep. 3, 1991, now abandoned.

BACKGROUND OF THE INVENTION

1. Field of the Invention

This invention relates to a three-dimensional modeling apparatus which generates a three-dimensional model from two-dimensional drawings.

2. Description of the Prior Art

The following methods of generating a three-dimensional solid model from two-dimensional drawings have been known:

H. Sakurai and D. C. Gossard, "Solid Model Input Through Orthographic View", *ACM Computer Graphics*, Vol. 17, No. 3, July 1985, pp. 243–252.

In such a method, a three-dimensional wireframe model is first provided from three two-dimensional projections, and a solid model is then provided based on the wireframe model.

V. N. Agasamy and N. A. Langrana, "Reconstruction of 3D Objects Using a KD Environment", *ASME Computers in Engineering* 1989, Vol. 1, July 1989, pp. 117–126.

In such a method, basic solids constituting a given solid are extracted from drawings, and a solid model is generated by combining these basic solids.

In utilization of CAD in product developing processes, it is desirable to use two-dimensional drawings easy to operate and express in the design process, and to use a three-dimensional model capable of exactly expressing the form of a product in processes after design. For that purpose, it is necessary to convert two-dimensional drawings into a higher-degree solid model.

At present, however, no methods which can convert two-dimensional drawings into a solid model on a practical level have been established.

A method using a wireframe, represented by the above-described first publication, has the following disadvantages:

(1) Unnecessary edges are generated in a process of first generating a three-dimensional wireframe model, and an operation to remove the edges is therefore needed.

(2) Various restrictions are present in converting a wireframe model into a solid model.

(3) Since candidates for a solid model include all shapes which can be considered from a wireframe model, the calculation load is very high. Furthermore, since any candidates which can be solid models are selected from among the above-described candidates, a plurality of models are in some cases provided.

(4) Errors in drawings and calculation cannot be tolerated.

A method represented by the second publication has the following disadvantages, though the method is effective for simple drawings:

(5) Basically, since pattern matching is performed inside a solid, the method cannot deal with a complicated shape.

(6) If small errors are included in drawings, the calculation process tends to run away.

In a conventional method of providing a three-dimensional solid model, as described in Toyomitsu Senda, "Automatic Restoration of an Original Solid from Three Projections", *Collection of Papers Presented at 8-th Design Symposium in Tokyo*, July 1990, as an example of providing a three-dimensional solid model from a three-dimensional wireframe, surfaces are extracted from a three-dimensional wireframe, candidates for a solid are generated by combining these surfaces, and a solid model is produced while comparing the model with three projections.

The conventional method has the disadvantage that geometrical information which is inconsistent with respect to phase may be generated due to errors in the shape and calculation, and therefore stable processing cannot be performed.

SUMMARY OF THE INVENTION

The present invention overcomes the above-described disadvantages, and realizes two-dimensional/three-dimensional conversion which can be pratically used.

The present invention provides a three-dimensional model by including means for forming section information of a substance existence space expressed by two-dimensional drawings, and extraction means for extracting three-dimensional geometrical and topological information.

In order to form a three-dimensional model from two-dimensional drawings, the two-dimensional drawings are first converted into 2.5-dimensional drawings. Connection information, relating to connections of surfaces constituting the three-dimensional solid, and characteristics of the surfaces themselves, that is, topological information and geometrical information about the surfaces, are extracted from the shapes of cut surfaces of solids formed while recognizing a substance existence space (space where the solid is present) expressed by the 2.5-dimensional drawings. A three-dimensional solid model is formed from the above-described two kinds of information entirely indendently of the two-dimensional drawings.

According to the present invention, since edges for generating a three-dimensional solid model are calculated after first determining topological information and geometrical information of surfaces extracted from the two-dimensional drawings, the load of calculation is light even in the case of a complicated shape, calculation does not run away due to errors, and a plurality of uncertain shapes are not output. Accordingly, two-dimensional drawings can be stably converted into a three-dimensional solid model. Even when dealing with drawings which include possible inconsistency and errors in future, the drawings can be flexibly dealt with by performing interactive correction for obtained topological information and geometrical information.

The present invention includes a step of extracting topological data of a solid based on surface-shape data and adjacent-surface data, and a step of extracting geometrical data based on the topological data extracted in the foregoing step. A three-dimensional solid model is efficiently formed using the data obtained in the above-described steps. By performing ordering of adjacent surfaces from the data of the shape of a given surface and adjacent surfaces, and obtaining topological data earlier than geometrical data, geometrical data of edges and vertices can be stably calculated using the topological data. Thus, a solid model is formed.

BRIEF DESCRIPTION OF THE DRAWINGS

FIG. 2 is a diagram illustrating a processing procedure of the embodiment of FIG. 1;

FIG. 3a is a diagram showing an example of information processed in the embodiment of FIG. 1;

FIG. 4 is a diagram showing still another example of information processed in the embodiment of FIG. 1;

FIG. 7 is a diagram illustrating phase data extraction processing of the embodiment of FIG. 6.

DETAILED DESCRIPTION OF THE PREFERRED EMBODIMENTS

Figure 1:
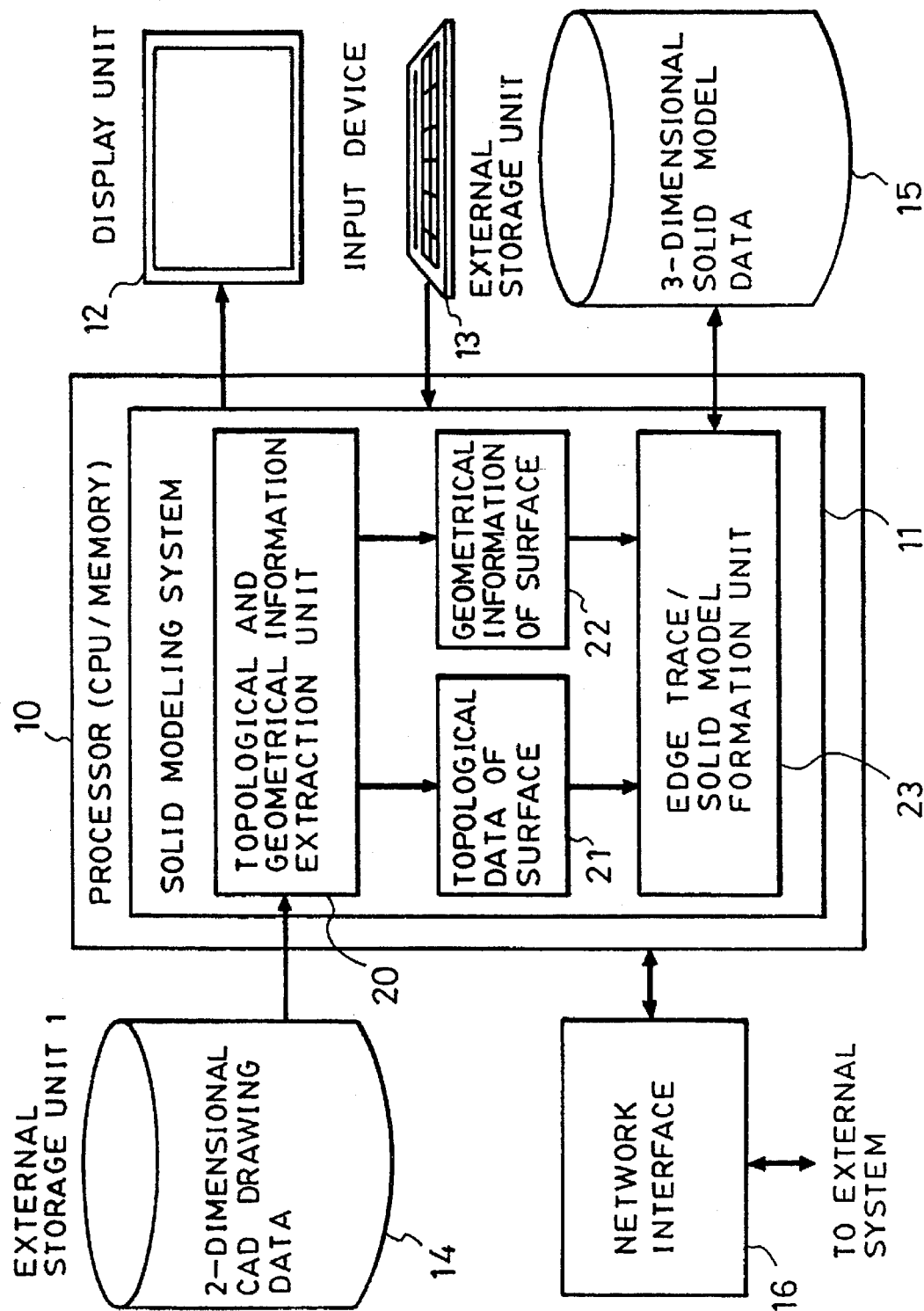
FIG. 1 is a block diagram illustrating an embodiment of the present invention.

FIG. 1 is a block diagram illustrating an embodiment of the present invention. In FIG. 1, a memory within a processor 10 stores a processing program for the procedure shown in FIG. 2. A solid modeling system 11 is realized in the processor 10 by execution of the program by a CPU (a calculating unit) of the processor 10. A display unit 12 displays a model obtained as a result of the processing, input drawings, or drawings during processing. An input device 13 inputs to the processor 10 a command or message for editing, correction, a position, or compensation, using a key, a cursor or an icon. A storage unit 14 stores two-dimensional CAD drawings, serving as input data to be processed. An external storage unit 15 outputs a three-dimensional solid model which is the result of processing. A network interface 16 performs communication with an external system. The modeling system 11 includes a topological and geometrical information extraction unit 20. A storage unit 21 stores topological data of extracted surfaces. A storage unit 22 stores geometrical data of surfaces. The modeling system 11 also includes an edge trace/solid model formation unit 23.

The processing of the present invention will now be explained with reference to the above-described configuration.

First, according to a command from the input device 13, two-dimensional CAD drawing data are loaded from the external storage unit 14 into the memory in the processor 10.

A command for processing is then input from the input device 13, so that the topological and geometrical information extraction unit 20 generates topological data and geometrical data of surfaces constituting a three-dimensional solid expressed by drawings based on the two-dimensional drawing data, and the generated data are stored in the storage units 21 and 22. After the completion of such processing, the edge trace/solid model formation unit 23 performs processing in which a three-dimensional solid model is generated from the topological data and the geometrical data of the surfaces. The three-dimensional solid model generated by such processing is stored in the external storage unit 15. The result is also displayed on the display unit 12.

An explanation will now be provided of detailed processing in the above-described respective processing units.

As shown in FIG. 2, the topological and geometrical formation extraction unit 20 shown in FIG. 1 performs the following processing: formation of 2.5-dimensional drawings in a first step; setting of a cutting level in a second step; formation of sections in a third step; topological scanning in a fourth step; and generation of topological and geometrical data of surfaces in a fifth step.

Step 1. Formation of 2.5-dimensional drawings

Figure 3B:
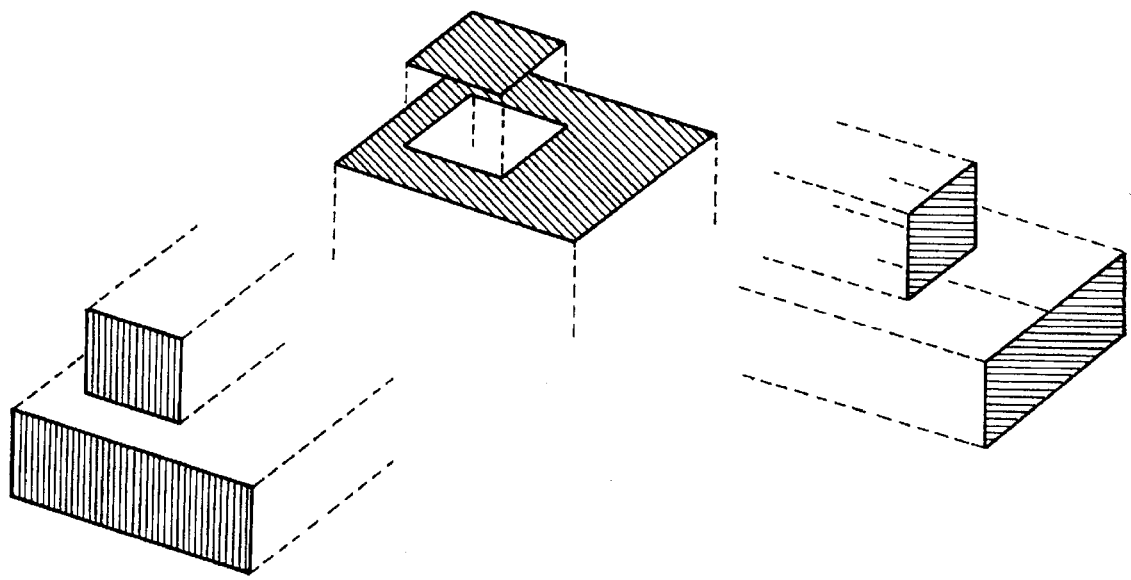
FIG. 3b is a diagram showing another example of information processed in the embodiment of FIG. 1.

As shown in FIG. 3a, the shapes (the shapes of surfaces) of closed regions on two-dimensional drawings in the direction of height are added to the regions, whereby 2.5-dimensional surface data as shown in FIG. 3b are formed.

1) The shape of a surface is defined for a region whose information in the direction of height can be uniquely recognized from the drawings.

2) A region which is clearly determined to be a hole from the drawings is defined as a hole.

3) The shape of a surface for a region which cannot be automatically recognized is input by the operator. That is, a message is displayed on the display unit 12 to make the operator input instructions via the input device 13.

Step 2. Setting of a cutting level

In the present apparatus, the topology of the entire shape is determined by scanning differences in topology of cut surfaces in each of the X, Y and Z directions. For that purpose, any small changes in any direction must not be overlooked. Hence, all points whose topology might change are picked up, and a cutting level so as to cut a zone (a characteristic zone of the element shape) between these points is set.

Step 3. Generation of the section

As shown in FIG. 4, the shapes of cut surfaces in characteristic zones of the shape in the X, Y and Z directions are determined, keeping in mind a substance existence space based on 2.5-dimensional data. With respect to such formation of the section:

No substance is present in front of (=the direction of the line of sight) surfaces defined as substances on 2.5-dimensional drawings.

A semi-infinite space (=a substance existence space) where a substance is present is present behind regions defined as substances on the 2.5-dimensional drawings.

No substance is present either in front of or behind a region defined as a hole on the 2.5-dimensional drawings.

An actual solid space expressed by the drawings is expressed in the form of a logical product of substance existence spaces claimed by respective views (drawings) on the drawings.

In consideration of the above-described items, the following processing is performed.

1) A cutting plane is set.

2) Semi-infinite (actually, finite) cut shapes which express semi-infinite substance existence spaces claimed by respective views are formed within the cutting plane.

3) The shape of a section of the solid is obtained by obtaining a logical product of semi-infinite cut shapes of respective views.

Step 4. Topological scanning

Figure 5:
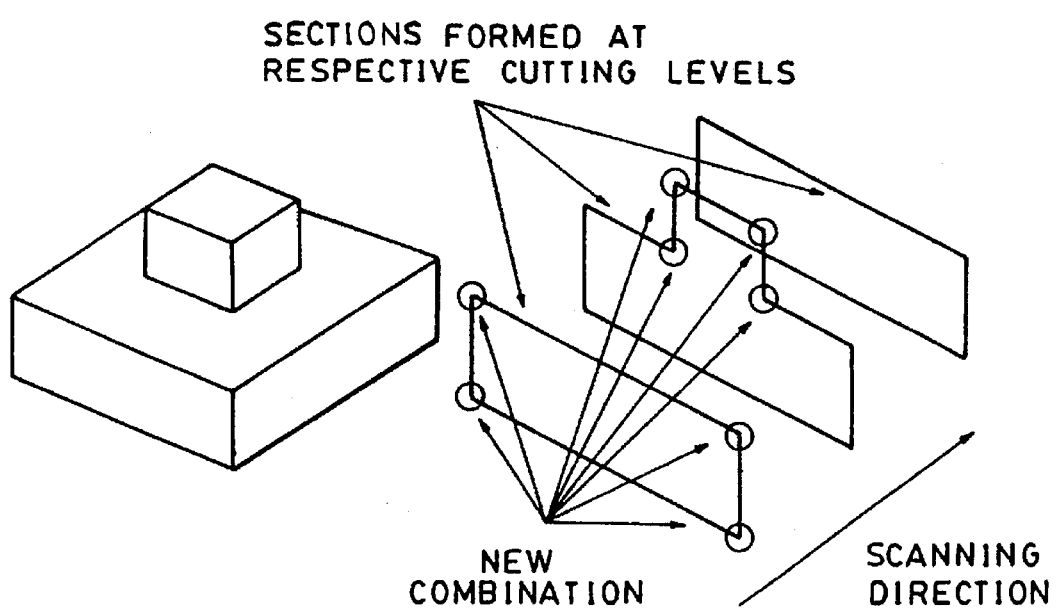
FIG. 5 is a diagram showing still another example of information processed in the embodiment of FIG. 1.

As shown in FIG. 5, the shape of the section is scanned in the X, Y and Z directions. A change in topology between adjacent surfaces is thereby recognized, and connecting information of surfaces is stored. That is, processing is performed in consideration of the following items.

If cut surfaces are formed with fine pitches in the X, Y and Z directions, and the formed cut surfaces are scanned, a change in connection relationship between surfaces constituting the section can be recognized.

In comparison in the scanning direction, if a combination of surfaces not present in the immediately preceding cutting level has appeared, this is recognized as connection information of surfaces constituting the solid.

The actual cutting position is a internal (=interval of characteristic point of the shape) between characteristic points of the shape in the X, Y and Z directions on the drawing.

In consideration of the above-described items, the following processing is performed:

1) Attribute information of the surface is added to each element of the shape of a cut surface.

2) A change in the topology of the section in the scanning direction is recognized while scanning in the X, Y and Z directions. Connection information (information on connections) between respective elements of the section having any change is stored as connection information of surfaces, serving as attribute information added to respective elements of the cut surface.

Step 5. Generation of topological/geometrical data of surfaces

1) Connection information of respective surfaces is arranged in units of a surface, and the arranged information is stored as connection information of surfaces.

2) Geometrical data of surfaces are generated from the attributes of respective surfaces and the shapes of the surfaces.

The edge trace/solid model formation unit 23 shown in FIG. 1 will now be explained in detail.

First, a graph search is performed based on connection information of a recognized surface, and loop ordering for adjacent surfaces is performed. Calculation of edges is performed from surfaces for which connection relationship is established, and a B-reps-type solid model having a winged-edge structure is formed. That is:

Edges of a surface are established according to connection information (topology) of the surface extracted from the drawings by topological scanning, and information of the shape (geometry) of the surface.

A graph search method is used in order to determine looping of adjacent surfaces and arrangement of adjacent surfaces.

Edges are established by calculating a line of intersection of surfaces for which the connection relationship is established.

In consideration of the above-described items, the following processing steps are performed:

1) Topological data (information of adjacent surfaces and, concave-convex information) and geometrical data (information of the shape of the surface) of the surface are received.

2) Looping of the surface and arrangement order of adjacent surfaces within a loop are determined using graph search based on information of adjacent surfaces.

3) Calculation of a line of intersection of adjacent surfaces is sequentially performed in accordance with the determined arrangement order within the loop to form edges.

4) Solid model data are generated from information of the formed edges.

Figure 6:
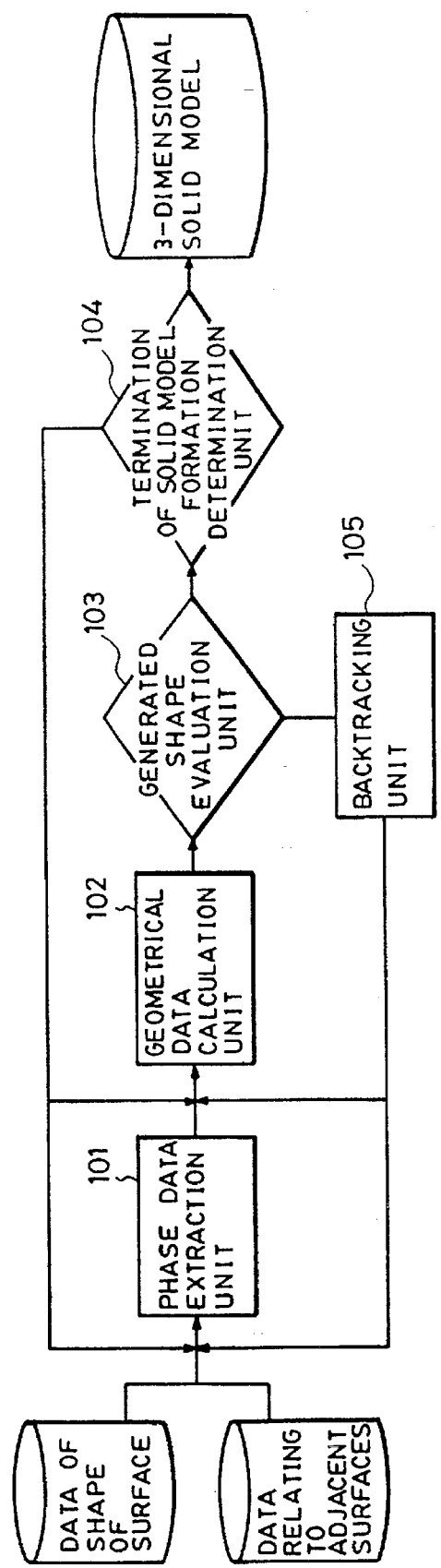
FIG. 6 is a block diagram illustrating another embodiment of the present invention.

By performing the above-described processing, the processing for forming a three-dimensional model from two-dimensional drawings can be efficiently realized. FIG. 6 is a block diagram illustrating another embodiment of the present invention. In FIG. 6, a phase data extraction unit 101 rearranges adjacent surfaces in accordance with connection order (performs ordering of adjacent surfaces).

A geometric data calculation unit 102 generates data of edges and vertices by calculating each point of intersection of lines of intersection of a target surface and each of several ordered adjacent surfaces.

A generated shape evaluation unit 103 investigates whether the generated edges are inconsistent in forming a solid.

A termination of solid model formation determination unit 104 determines termination of solid model formation.

A backtracking unit 105 selects another candidate when it is determined that the wrong candidate has been selected.

A method of forming a solid model from data of the shape of a surface and adjacent surfaces will now be sequentially explained with reference to the block diagram shown in FIG. 6.

First, an explanation will be provided of a procedure of forming a solid model from the shape of a surface and data of adjacent surfaces.

I) As in steps shown in FIG. 7, the topological data extraction unit 101 performs the following processing.

1) A table $C=\{c1, c2, c3, \ldots cn\}$ of adjacent surfaces, i.e., a set of adjacent surfaces, is formed for each surface constituting a solid, referring to data of adjacent surfaces.

2) A table $D=\{(c1, c2, \ldots (Cn-k, Cn)\}$ of connection relationship of adjacent surfaces, i.e., a set of combination of surfaces in connection relationship in the table of adjacent surfaces, is formed for each surface constituting the solid.

3) Respective elements of the table C correspond to edges of a target surface in a solid shape, and respective elements of the table D correspond to vertices on the target surface. Since an edge is connected to forward and backward edges at vertices, a closed loop is formed by arranging adjacent surfaces in the order of connection (ordering of adjacent surfaces) from the information in the tables C and D, and data of the order of arrangement of the edges, and data of the edges constituting the loop are formed as topological data.

Solid topological data are formed for respective surfaces by sequentially performing the above-described processing.

Figure 8:
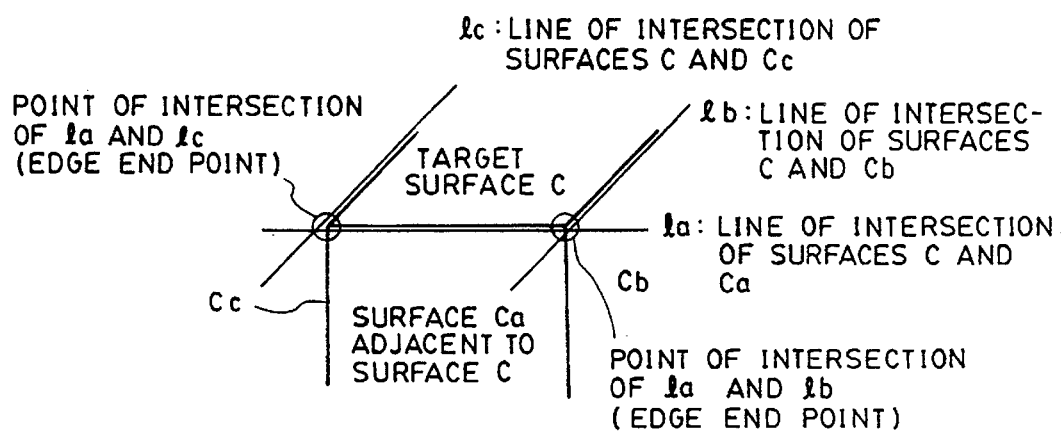
FIG. 8 is a diagram illustrating geometrical data processing of the embodiment of FIG. 6.

II) As shown in FIG. 8, geometric data formed as described above are processed by the geometric data calculation unit 102 in the following way:

1) For each surface constituting the solid, respective lines of intersection of a target surface (c) and a surface ($c_a$) adjacent thereto, and of surfaces ($c_b$ and $c_c$) adjacent to the target surface and connected to the surface ($c_a$), and the target surface (c):

1a: line of intersection of the surfaces c and $c_a$

1b: line of intersection of the surfaces c and $c_b$

1c: line of intersection of the surfaces c and $c_c$,

An edge formed by the surfaces c and $c_a$ has the geometrical shape of the line 1a of intersection.

2) End points of the above-described edge are determined by calculating points of intersection of lines 1a and 1b, and 1a and 1c. In some cases, a plurality of lines of intersection and points of intersection are obtained in steps 1) and 2). In such cases, candidates for an edge are generated in the order of obtaining lines of intersection and points of intersection, and processing of search is performed until the correct shape of the edge is obtained by the generated shape evaluation unit 103 (to be described later).

III) Generated shape evaluation unit 103

1) Whether or not a generated edge is inconsistent in forming a solid is evaluated in accordance with the following standard of determination:

a) Concave-convex relationship of adjacent surfaces in connection is maintained for the edge.

b) Crossing with other edges is not present except at end points.

2) If the generated candidate for the edge satisfies the conditions a) and b), the geometrical shape and border of the edge are established.

3) For a candidate for the edge which does not satisfy at least one of the conditions a) and b), it is assumed that an error is present in the preceding processing, and backtracking processing is performed.

IV) Subsequently, the termination of solid model formation determination unit 104 performs the following processing:

1) If edge data are established for all surfaces, a solid model having the form of border expression is established, and processing is terminated.

2) If all closed loops are established for the target surface, processing by the topological data extraction unit 101 is performed for unestablished surfaces.

3) If all edge data are established within ordered closed loops, processing by the phase data extraction unit 101 is performed for other unestablished closed loops of the same surface.

4) Processing by the geometrical data calculation unit 102 is performed for any unestablished edges connected to the established edge.

V) If an error is present in the above-described processing, the error is corrected by the backtracking unit 105.

In the present embodiment, when a plurality of candidates are obtained in the process of forming a solid model, 1) the candidates are mounted so as to form a stack,
2) A candidate is sequentially selected from the stack, and
3) processing is continued for the selected candidate.

If the wrong candidate is selected in the course of processing, inconvenience occurs in the following processing units. In that case, 4) returning to the state wherein the plurality of candidates are present,
5) the next candidate on the stack is selected, and
6) processing is continued again.

As described above, according to the present invention, by first extracting phase data, and subsequently calculating geometrical data, a shape-processed three-dimensional model can be stably formed. Furthermore, by performing searching processing while evaluating generated shapes for a plurality of candidates, a three-dimensional model can be formed.

As described above, the present invention includes a step of extracting topological data of a solid based on surface-shape data and adjacent-surface data, and a step of extracting geometrical data based on the topological data extracted at the foregoing step. A three-dimensional solid model is efficiently formed using the data obtained at the above-described steps. Hence, it is possible to automatically form a solid model.

What is claimed is:

1. A three-dimensional drawing forming apparatus comprising:

recognizing means for recognizing a closed region of two-dimensional drawings, said recognizing means performing recognizing with regard to two-dimensional drawings of a first direction and those of a second direction, respectively;

addition means for adding information in a depth direction to the closed region recognized by said recognizing means, said addition means performing addition with regard to two-dimensional drawings of a first direction and those of a second direction, respectively;

section forming means for forming a plurality of sectional information in accordance with the information in the depth direction added to the recognized closed region; and drawing forming means for forming a three-dimensional drawing from the plurality of sectional information.

2. A three-dimensional drawing forming apparatus according to claim 1, wherein the two-dimensional drawings are a three-dimensional drawing expressed from three directions.

3. A three-dimensional drawing forming apparatus according to claim 1, further comprising display means for displaying a three-dimensional drawing formed by said drawing forming means.

4. A three-dimensional drawing forming method comprising the steps of:

recognizing a closed region of two-dimensional drawings, said recognizing step performing recognizing with regard to two-dimensional drawings of a first direction and those of a second direction, respectively;

adding information in a depth direction to the closed region recognized in the recognizing step, said adding step performing addition with regard to two-dimensional drawings of a first direction and those of a second direction, respectively;

forming a plurality of sectional information in accordance with the information in the depth direction added to the recognized closed region; and forming a three-dimensional drawing from the plurality of sectional information.

5. A three-dimensional drawing apparatus comprising:

storage means for storing two-dimensional drawings of a three-dimensional drawing expressed from three directions;

recognizing means for recognizing a closed region of the two-dimensional drawings, said recognizing means performing recognizing with regard to two-dimensional drawings of a first direction and those of a second direction, respectively;

addition means for adding information in a depth direction to the closed region recognized by said recognizing means, said addition means performing addition with regard to two-dimensional drawings of a first direction and those of a second direction, respectively;

section forming means for forming section information of at least two directions in accordance with the information in the depth direction added to the recognized closed region; and drawing forming means for forming a three-dimensional drawing in accordance with the formed section information.

6. A three-dimensional drawing apparatus according to claim 5, further comprising indicating means for indicating a form of a three-dimensional drawing, said recognizing means recognizing the closed region in response to the form indicated by said indicating means.

* * * * *

UNITED STATES PATENT AND TRADEMARK OFFICE
CERTIFICATE OF CORRECTION

PATENT NO. : 5,671,343

DATED : September 23, 1997

INVENTOR(S) : SATOSHI KONDO ET AL.

It is certified that error appears in the above-identified patent and that said Letters Patent is hereby corrected as shown below:

[57] ABSTRACT

Line 2, "section" should read --sections--.

COLUMN 6

Line 15, "(Cn-k, Cn)}" should read --(cn-k, cn)}--.
Line 40, "Cc," should read --Cc.--.

COLUMN 7

Line 22, "A" should read --a--.
Line 32, "phase" should read --topological--.

Signed and Sealed this

Thirty-first Day of March, 1998

BRUCE LEHMAN

Attesting Officer      Commissioner of Patents and Trademarks